(12) United States Patent
Aoshima

(10) Patent No.: US 6,465,916 B2
(45) Date of Patent: *Oct. 15, 2002

(54) MOTOR

(75) Inventor: Chikara Aoshima, Zama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,677

(22) Filed: Nov. 30, 1999

(65) Prior Publication Data

US 2002/0047334 A1 Apr. 25, 2002

(30) Foreign Application Priority Data

Dec. 4, 1998 (JP) .................................... 10-361923
May 26, 1999 (JP) .................................... 11-146687

(51) Int. Cl.[7] .................................. H02K 7/00; H02K 37/14; B06B 1/00
(52) U.S. Cl. .................. 310/49 R; 310/67 R; 310/257; 310/261; 310/266; 310/156.02; 310/179
(58) Field of Search .............................. 310/49 R, 257, 310/156, 67 R, 266, 152, 179, 40 MM, 261, 263, 254

(56) References Cited

U.S. PATENT DOCUMENTS

| 3,330,975 A | | 7/1967 | Osterwalder ............... 310/164 |
| 4,004,168 A | * | 1/1977 | Haydon ....................... 310/41 |
| 5,384,506 A | | 1/1995 | Aoshima ................... 310/49 R |
| 5,780,947 A | | 7/1998 | Fukuoka et al. ............. 310/80 |
| 5,798,588 A | | 8/1998 | Okuyama et al. ............ 310/81 |
| 5,831,356 A | | 11/1998 | Aoshima ..................... 310/49 |
| 5,925,945 A | | 7/1999 | Aoshima ................... 310/49 R |
| 5,945,753 A | | 8/1999 | Maegawa et al. .......... 310/68 B |
| 5,969,453 A | | 10/1999 | Aoshima ..................... 310/156 |
| 5,973,425 A | | 10/1999 | Aoshima ................... 310/49 R |
| 6,081,053 A | * | 6/2000 | Maegawa ................... 310/49 R |
| 6,157,107 A | * | 12/2000 | Aoshima et al. ............ 310/156 |

FOREIGN PATENT DOCUMENTS

| FR | 1409034 | 12/1965 | |
| FR | 2214990 | 8/1994 | ............ H02K/1/06 |
| GB | 2 067 024 A | 7/1981 | ............ H02K/37/00 |
| JP | 08-146161 | 6/1996 | ............ G04G/1/00 |

OTHER PUBLICATIONS

U.S. application No. 09/293,063, Apr. 16, 1999.
U.S. application No. 09/111,786, Jul. 8, 1998.
U.S. application No. 09/290,408, Apr. 13, 1999.
U.S. application No. 09/455,412, Dec. 6, 1999.

* cited by examiner

Primary Examiner—Burton S. Mullins
(74) Attorney, Agent, or Firm—Fitzpatrick, Cella, Harper & Scinto

(57) ABSTRACT

A coil is disposed in an axial direction of a rotor magnet, outer and inner magnetic poles to be magnetized by the coil are opposed to outer and inner peripheral surfaces of the rotor magnet, and a holder for holding the centers of the magnetized portions of the magnet at positions deviated from the straight line connecting the centers of the outer magnetic poles and the rotational center of the magnet when the outer and inner magnetic poles are not magnetized, thereby realizing a single phase motor. When the single phase motor is constructed, a weight having an imbalanced mass with respect to a rotational center is attached to a rotary shaft of the motor, and the weight secured to the rotary shaft is covered by a cylindrical cover within which the outer magnetic poles are secured, so that a stable vibration can be generated, thereby providing a super-compact motor having high output for a communication apparatus.

8 Claims, 11 Drawing Sheets

MOTOR

BACKGROUND OF THE INVENTION

1. Field of the Invention

The present invention relates to a super-compact motor suitable for arrival or destination informing apparatus in a portable telephone, for example.

2. Related Background Art

Among communication apparatuses for portable equipments, an alarming device for informing the user of communication by vibration is already known. In such a pager motor, a weight having an imbalanced mass is attached to an output shaft of the motor so that vibration is generated when the motor is rotatingly driven. Such motors will be widely used in the future. It is desirable that such a motor be made more compact as the portable equipment becomes small-sized.

In the past, as a type suitable for a compact motor, a brushless type is known. Among the motors of brushless type, there are the following stepping motors having a simple circuit.

A compact cylindrical stepping motor as shown in FIG. 19 is known. Stator coils 105 are concentrically wound around corresponding bobbins 101. The bobbins 101 are pinched and secured between corresponding stator yokes 106 from an axial direction, and the stator yokes 106 have stator teeth 106a and stator teeth 106b arranged alternately along a circumferential direction of inner surfaces of the bobbins 101. The stator yokes 106, integral with the stator teeth 106a or 106b, are secured to cases 103 to constitute a stator 102.

A flange 115 and a bearing 108 are secured to one of a set of cases 103, and another bearing 108 is secured to the other case 103. A rotor 109 comprises a rotor magnet 111 secured to a rotor shaft 110, and radial gaps are defined between the rotor magnet 111 and the stator yokes 106 of the stator 102. The rotor shaft 110 is rotatably supported by the bearings 108.

Further, a stepping motor driven by a single coil and widely used with a clock as shown in FIG. 21 is also known. A rotor 201 comprises a permanent magnet and is associated with a stator 203 and a coil 204.

However, in the conventional compact stepping motor shown in FIG. 19, since the cases 103, bobbins 101, stator coils 105 and stator yokes 106 are concentrically arranged around the rotor, the entire dimension of the motor becomes great. Further, as shown in FIG. 20, since magnetic flux generated by energization of the stator coil 105 mainly passes through an end face 106a1 of the stator tooth 106a and an end face 106b1 of the stator tooth 106b, the magnetic flux does not act on the rotor magnet 111 effectively, with the result that a high output of the motor cannot be obtained.

Also regarding the motor shown in FIG. 21, magnetic flux generated by energization of the coil is concentrated into the smallest gap between the stator 203 and the coil 204 and does not act on the magnet effectively.

In a pager motor in which the weight having an mass imbalanced with respect to a rotational center is attached to the output shaft of the motor to convert rotation of the motor into vibration, since the weight is attached on an outer surface of the motor body, the assembling must be effected very carefully so that lead wires, a flexible print substrate, and the like are not positioned in a rotation path of the weight.

A destination informing device of the wrist-watch type has also been proposed, as disclosed in Japanese Patent Laid-Open No. 8-146161 (1996).

In this case, since a weight is secured to an output shaft protruded outwardly from a motor, the entire motor including the weight must be covered by a case, which makes compactness of the destination informing device difficult to achieve. Further, when the user wears the communication device on a portion of his body where vibration can easily be detected, the presence of such a device is not preferable from the viewpoint of fashion. An example is shown in FIG. 22. In FIG. 22, the reference numeral 300 denotes a motor; 301 denotes a weight; 302, 303 denote cases of the destination informing device; and 304 denotes a motor attaching member for attaching the motor 300 to the case 303. Since the weight 301 is associated with the cases 302, 303 via the motor 300 and the motor attaching member 304, in FIG. 22, great gaps a, b must be maintained between the weight 301 and the cases 302, 303. Thus, the thickness t of the destination informing device is increased.

In communication device of the wrist-watch type, if the user has already worn his wrist watch on his wrist, the fact that both the wrist watch and the communication device are worn on his wrist is not preferable from the viewpoint of fashion. Further, although it is considered that a communication device is incorporated into a wrist watch itself, since the design, the size, and the color of the watch are limited, it is not preferable from the viewpoint of fashion.

As a compact motor for a communication apparatus, a cored AC motor or coreless AC motor of brush type can be used. However, since such a motor has a relatively large number of constructional parts, if the motor is made super-compact, it becomes difficult to manufacture and assemble such constructional parts, which leads to an increase in cost.

The inventors have proposed a motor solving the disadvantage of the conventional motor shown in FIG. 19, as disclosed in U.S. Pat. No. 5,831,356.

In this proposed motor, a cylindrical rotor comprises permanent magnets equidistantly disposed in a circumferential direction and having alternate magnetic poles; a first coil, a rotor and a second coil are sequentially disposed in an axial direction of the rotor; a first outer magnetic pole and a first inner magnetic pole which are excited by the first coil an are opposed to outer and inner peripheral surfaces of the rotor, and a second outer magnetic pole and a second inner magnetic pole, which are excited by the second coil are opposed to the outer and inner peripheral surfaces of the rotor; and a rotary shaft (rotor shaft) extends from the interior of the cylindrically arranged permanent magnets.

Although such a motor can have a high output and a small outer dimension, since the diametrical dimensions of the inner magnetic poles are small, it is difficult to manufacture magnetic teeth. Further, it has been requested that a stable output having no vibration be obtained from a motor having a small diametrical dimension.

To this end, the inventors have recently proposed a motor in which inner magnetic poles have configuration having good workability, as described in U.S. patent application Ser. No. 08/994,994, and the inventors have also proposed a rotor in which output transmitting means, such as a gear or a pulley, can easily be attached to a rotary shaft having a small diametrical dimension and a stable output having no vibration can be obtained, as described in U.S. patent application Ser. No. 09/022,474.

Recently, it has been requested to provide a motor having a high output and super-compact size.

To this end, the inventors have recently proposed a motor constructed as a single phase motor to achieve high output and super-compact size, as described in U.S. patent application Ser. No. 09/293,063.

In recent years, it has been requested that such a motor having a high output and super-compact size be applied to a destination informing apparatus.

SUMMARY OF THE INVENTION

The present invention aims to eliminate the above-mentioned conventional drawbacks, and an object of the present invention is to provide a motor having a configuration suitable for a communication apparatus, in which a high output can be obtained with a simple construction.

Another object of the present invention is to provide a motor for a communication apparatus, in which the motor is constructed as a single phase motor to stabilize initial positioning of a rotor.

The other objects and features of the present invention will become more apparent upon consideration of the following description of the preferred embodiments of the present invention taken in conjunction with the accompanying drawings.

DESCRIPTION OF THE PREFERRED EMBODIMENTS

The present invention will now be explained in connection with embodiments thereof with reference to the accompanying drawings.

Figure 1:
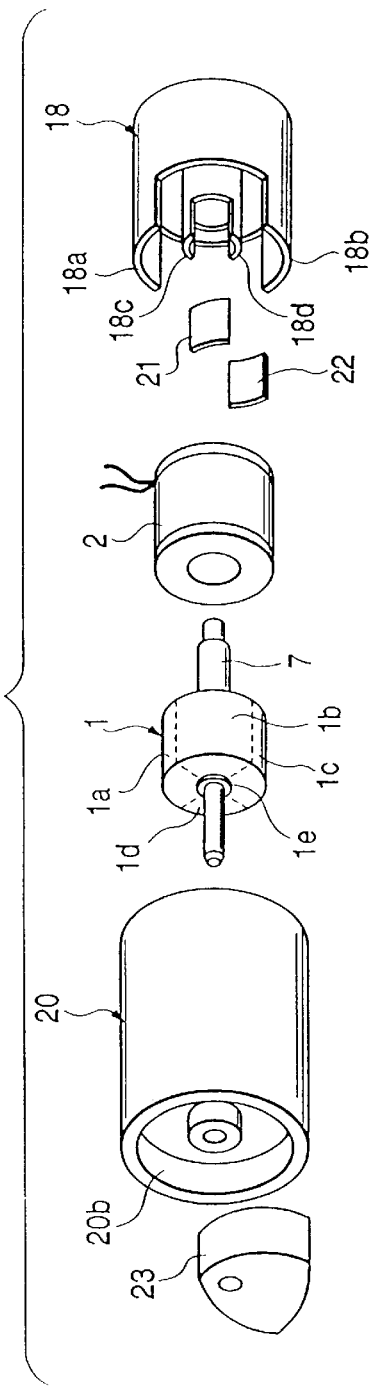
FIG. 1 is an exploded perspective view of a motor according to a first embodiment of the present invention.

While a first embodiment of the present invention is explained hereinbelow, a fundamental construction of a stepping motor according to the present invention will first be described with reference to FIGS. 1 and 2. FIG. 1 is an exploded perspective view of the stepping motor, and FIG. 2 is a sectional view of the stepping motor of FIG. 1 in an assembled condition.

Figure 2:
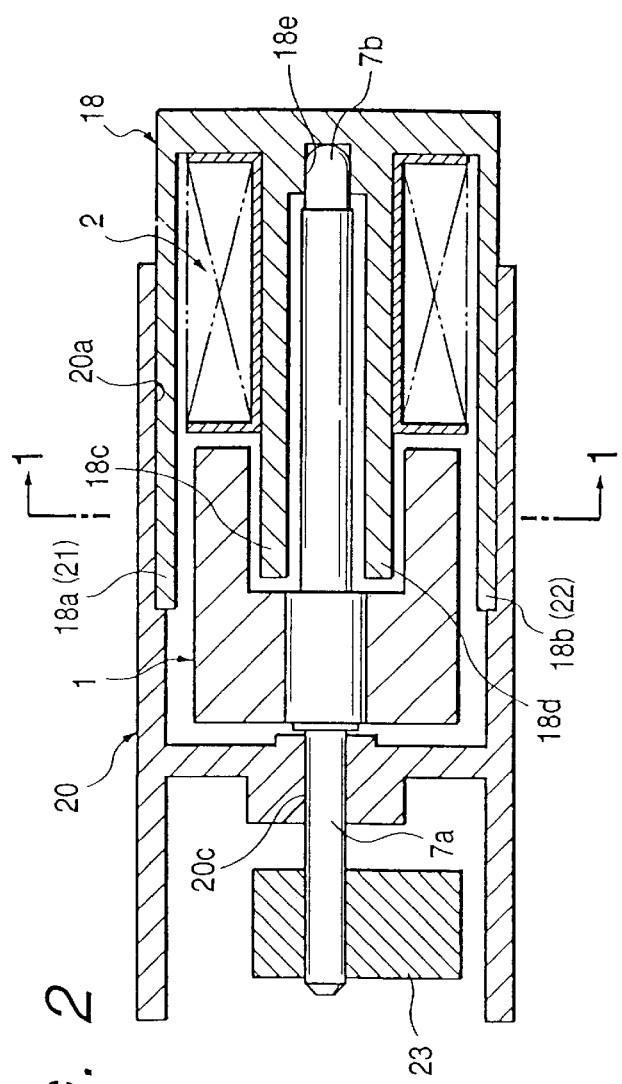
FIG. 2 is a sectional view of the motor of FIG. 1 in an assembled condition.

In FIGS. 1 and 2, a cylindrical magnet 1 forming a rotor has magnetized portions 1a, 1b, 1c, 1d obtained by dividing the magnet into n parts (four parts in the illustrated embodiment) in a circumferential direction and alternately magnetized to S and N poles. The magnetized portions 1a, 1c are magnetized to S poles and the magnetized portions 1b, 1d are magnetized to N poles. The centers of the magnetized portions 1a, 1b, 1c, 1d are shown by K1, K2, K3, K4 in FIG. 3. The magnet 1 is formed from plastic magnet material, which can be injection-molded. By using such material, the radial thickness of the cylindrical magnet can be minimized (very thin).

The magnet 1 is provided at its axial center with a fitting portion 1e having a small diameter. An output shaft (rotor shaft) 7 is press-fitted into the fitting portion 1e of the magnet 1 constituting the rotor. Since the magnet 1 is formed from plastic by injection molding, the magnet is not cracked during the injection molding, and, nevertheless the magnet has a relatively complicated configuration in which the fitting portion 1e having a small diameter is formed in the center of the magnet, so that it can easily be manufactured. Further, the output shaft 7 is assembled and secured to the magnet 1 by the press-fit, so that the assembling is facilitated and the manufacturing cost becomes cheaper. The output shaft 7 and the magnet 1 constitute the rotor.

Particularly, as the material for the magnet 1, a mixture obtained by blending rare earth magnetic powder of Nd-Fe-B group and thermoplastic resin binder is used, and such mixture is injection-molded to form the plastic magnet. Thus, in comparison with the fact that a magnet manufactured by compression molding has a bending strength of about 500 Kgf/cm$^2$, for example, here polyamide resin is used as the binder material, so that bending strength of more than 800 Kgf/cm$^2$ can be obtained, and a thin wall cylinder, which could not be achieved by the compression molding, can be obtained. When the magnet is constructed as the thin wall cylinder, performance of the motor is enhanced, as will be described later.

Further, a free configuration can be selected, so that a configuration for securing the rotor shaft (which cannot be achieved by compression-molding) can be integrated, and adequate rotor shaft securing strength can be obtained. Further, since excellent strength is a given here, even when the rotor shaft is press-fitted into the magnet, the magnet does not crack.

At the same time, by integrally forming the rotor shaft securing portion, coaxial accuracy of the magnet portion with respect to the rotor shaft portion is enhanced, with the result that vibration can be minimized and the distance between the magnet and the stator portion can be reduced. Further, although the magnetic property of the injection-molded magnet is 5 to 7 MGOe in comparison with the magnetic property of 8 MGOe or more of the compression magnet, so that adequate output torque of the motor can be obtained.

Further, since the injection-molded magnet has a thin resin surface film, generation of rust is greatly suppressed in comparison with the compression magnet. Thus, anti-rust treatment such as painting, can be omitted. In an injection-molded magnet there does not arise a problem regarding adhesion of magnetic powder which would be caused in a compression magnet. Further, since there is no swelling of a surface which would be easily caused in anti-rust painting, the quality of the magnet is improved.

A cylindrical coil 2 is disposed coaxial with the magnet 1 side by side in an axial direction and has an outer diameter substantially the same as that of the magnet 1.

A stator 18 is made of soft magnetic material and has an outer cylinder and an inner cylinder. The coil 2 is disposed between the outer and inner cylinders of the stator 18 so that the stator is energized when electricity is supplied to the coil 2. Tip end portions of the outer and inner cylinders of the stator 18 constitute outer magnetic poles 18a, 18b and inner magnetic poles 18c, 18d. The phases of the inner magnetic poles 18c and 18d are deviated from each other by 360/(n/2) degrees, i.e., 180 degrees so that the magnetic poles have the same phases. The outer magnetic pole 18a is opposed to the inner magnetic pole 18c, and the outer magnetic pole 18b is opposed to the inner magnetic pole 18d. The outer magnetic poles 18a, 18b of the stator 18 are constituted by notches and teeth extending in parallel with the shaft.

With the arrangement as mentioned above, the magnetic poles can be formed while minimizing the diameter of the motor. Namely, if the outer magnetic poles are constituted by protrusions and recesses extending in a radial direction, the diameter of the motor is increased accordingly; however, in the illustrated embodiment, since the outer magnetic poles are constituted by the notches and the teeth extending in parallel with the shaft, the diameter of the motor can be minimized.

The outer magnetic poles 18a, 18b and the inner magnetic poles 18c, 18d of the stator 18 are disposed in such a manner that they are opposed to outer and inner peripheral surfaces of one end portion of the magnet to pinch the one end portion of the magnet therebetween. One end of an output shaft 7 is rotatably received in a hole 18e of the stator 18.

Accordingly, since the magnetic flux generated by the coil 2 traverses across the magnet (rotor) 1 between the outer magnetic poles 18a, 18b and the inner magnetic poles 18c, 18d, the magnetic flux acts on the magnet effectively, thereby enhancing the output of the motor.

Further, as mentioned above, the magnet 1 is formed from plastic magnet material by the injection molding, so that the thickness of the cylinder in the radial direction can be reduced greatly. As a result, the distances between the outer magnetic poles 18a, 18b and the inner magnetic poles 18c, 18d can be minimized, thereby reducing the magnetic reluctance of a magnetic circuit constituted by the coil 2 and the first stator. Thus, much magnetic flux can be generated by a smaller current, thereby enhancing the output of the motor, reducing electric power consumption, and making the coil more compact.

A cover (cylindrical member) 20 is made of non-magnetic material, and the outer magnetic poles 18a, 18b are fitted within the interior 20a of the cover 20 and are secured to the cover by adhesive or the like.

A fitting portion 7a of the output shaft 7 is rotatably fitted in a fitting hole 20c of the cover 20 and a fitting portion 7b is rotatably fitted in a fitting hole 18e of the stator 18.

A weight member 23 is secured to the output shaft 7 so as to be rotated together with the output shaft 7 and the magnet 1. The weight member 23 has a configuration so that it has an imbalanced mass with respect to the rotational center, with the result that vibration is generated by rotation of the output shaft 7 and the magnet 1.

Further, the weight member 23 is disposed within the other interior 20b of the cover 20 so that the weight member 23 is prevented from being contacted inadvertently from outside.

The interior of the cylindrical cover 20 is divided into the interior 20a and the interior 20b by a partition wall having the fitting hole 20c. Constructional elements of the motor are contained within the interior or chamber 20a and the weight member 23, secured to the output shaft, is contained within the interior or chamber 20b.

Figure 3:
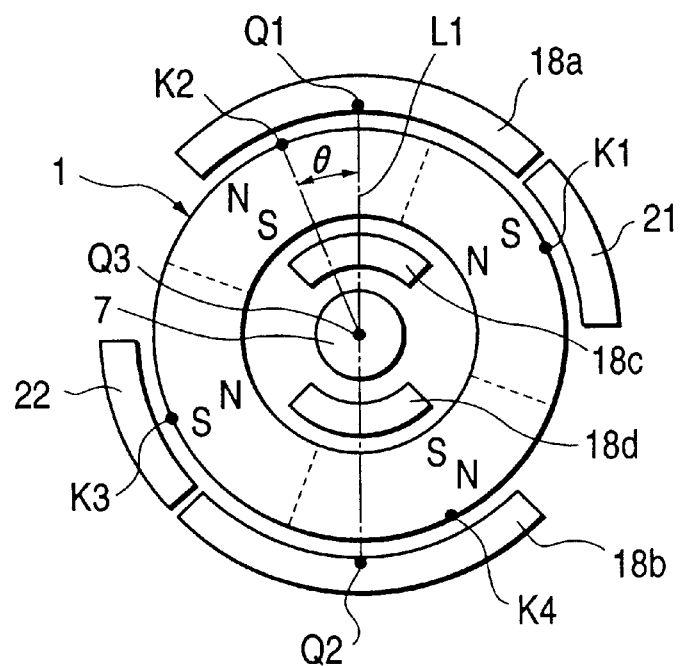
FIG. 3 is a view showing the positional relationship between a rotor and the stator of the motor of FIG. 2 and showing a condition of the rotor when the coil is not energized.

FIG. 2 is a sectional view of the stepping motor, and FIGS. 3 to 6 are sectional views taken along the line A—A in FIG. 2. "Q1" in FIG. 3 represents the center of the outer magnetic pole 18a of the stator 18, "Q2" represents the center of the outer magnetic pole 18b of the stator 18, and "Q3" represents the rotational center of the magnet 1.

In FIGS. 3 to 6, positioning stators 21, 22 are made of soft magnetic material and are secured within the interior chamber 20a of the cover 20. The positioning stator 21 is opposed to the outer peripheral surface of the magnet 1 and is disposed between the outer magnetic poles 18a and 18b of the stator 18. As shown in FIGS. 3 to 6, the positioning stator 21 is arranged near the outer magnetic pole 18a between the outer magnetic poles 18a and 18b, and the positioning stator 22 is arranged near the outer magnetic pole 18b between the outer magnetic poles 18a and 18b.

The positioning stator 21, 22 do not contact with the stator 18 and are not opposed to the inner magnetic poles 18c, 18d or are sufficiently spaced apart from the inner magnetic poles 18c, 18d. Accordingly, even when electricity is supplied to the coil 2, the positioning stators are almost not magnetized, unlike to the outer magnetic poles 18a, 18b, thereby not contributing to the driving of the magnet 1.

By the presence of the positioning stators 21, 22, when electricity is not supplied to the coil 2, the magnet 1 is stopped at a position shown in FIG. 3. That is to say, the stop position is selected so that the centers K1, K2, K3, K4 of the magnetized portions of the magnet 1 are stopped at positions (as shown in FIG. 3) deviated from the straight line L1 connecting the centers of the stator 18 and the rotational center of the magnet 1. For example, the center K2 is stopped at a position where the center is deviated from the straight line L1 by an angle θ.

In this position, when electricity is supplied to the coil 2, as mentioned above, the positioning stators 21, 22 are not magnetized, but the outer magnetic poles 18a, 18b and the inner magnetic poles 18c, 18d are magnetized, and forces of the magnetized outer magnetic poles 18a, 18b acting on the magnetized portions of the magnet 1 always direct toward the rotational direction of the magnet. Thus, the driving of the magnet can be started smoothly.

Figure 17:
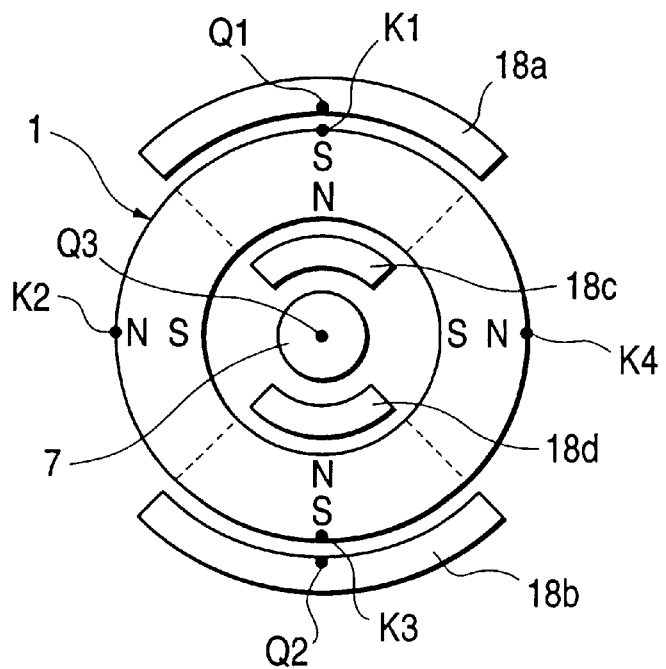
FIG. 17 is a view showing the positional relationship between a rotor and a stator in which there is no initial positioning means for the rotor and showing a first stable condition of the rotor when a coil is not energized.
Figure 18:
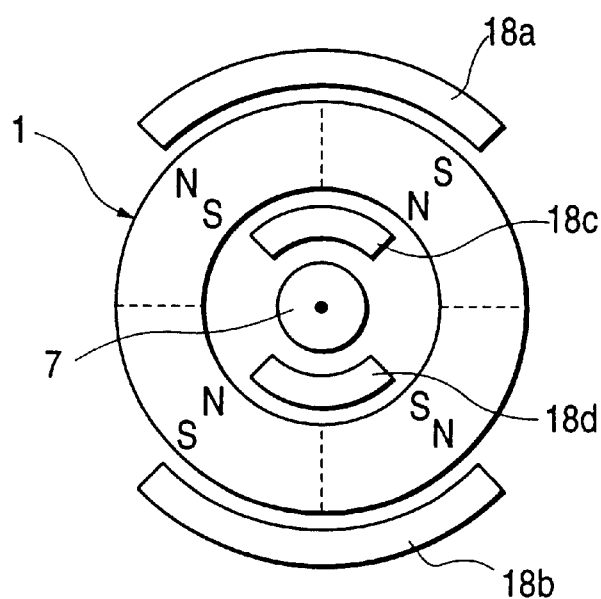
FIG. 18 is a view showing a second stable condition of the rotor when the coil is not energized.
Figure 19:
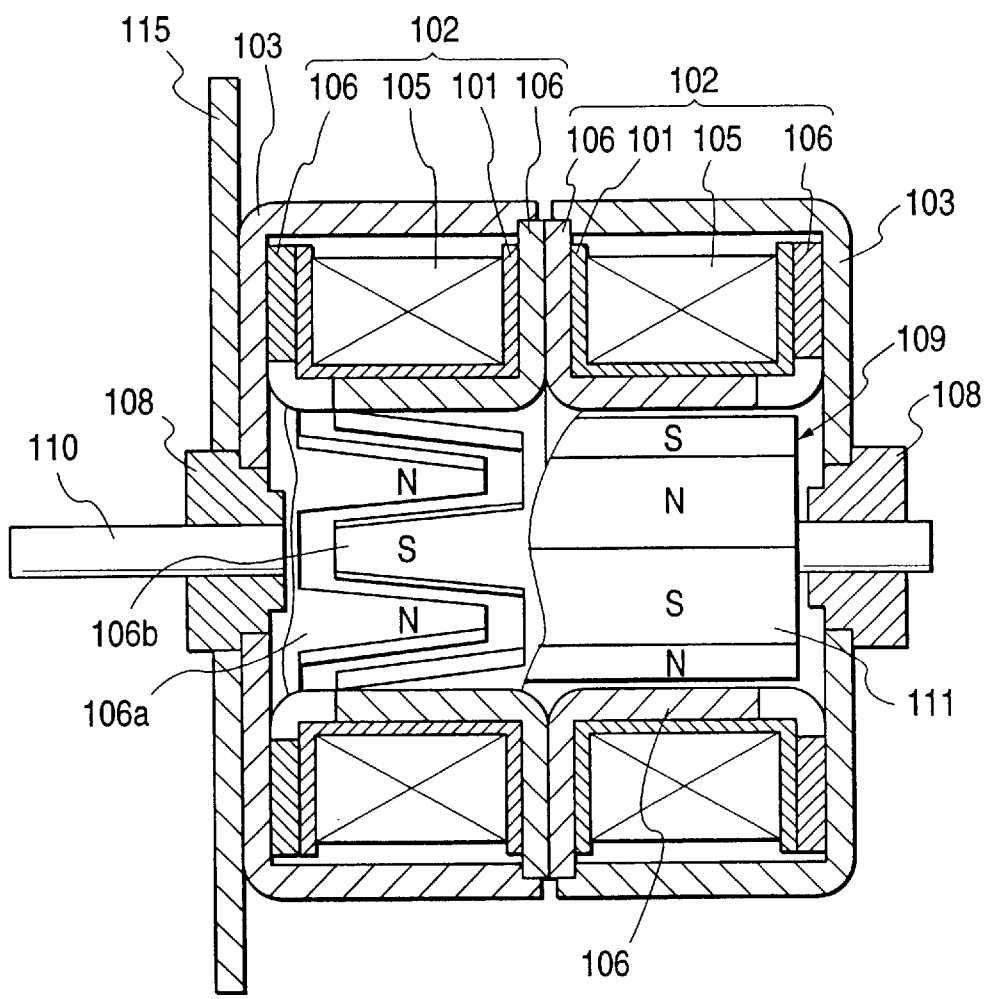
FIG. 19 is a sectional view of a conventional stepping motor.
Figure 20:
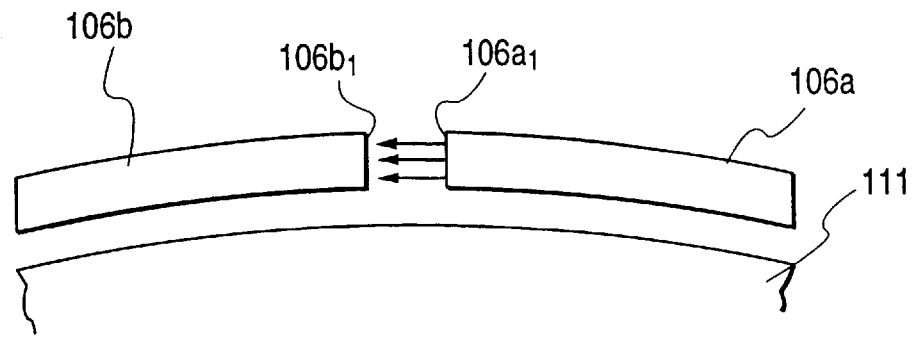
FIG. 20 is a view for explaining magnetic flux generated in the conventional stepping motor of FIG. 19.
Figure 21:
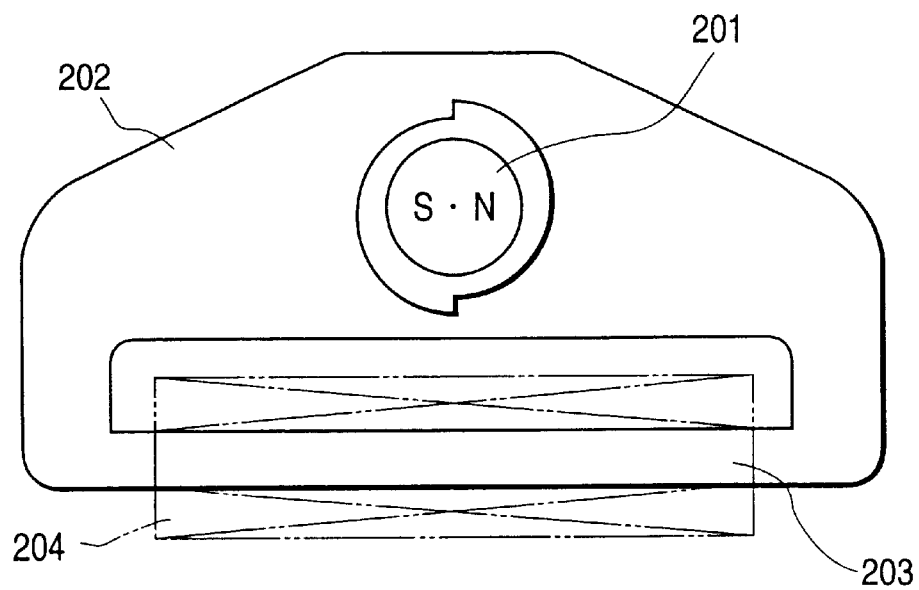
FIG. 21 is a plan view showing a conventional single phase motor.

If the positioning stators 21, 22 are not provided, when electricity is not supplied to the coil 2, the magnet 1 is stably stopped at either a position shown in FIG. 17 or a position shown in FIG. 18. In the position shown in FIG. 17, since the centers K1, K2, K3, K4 of the magnetized portions of the magnet 1 are positioned on the straight line connecting the centers Q1, Q2 of the outer magnetic poles and the rotational center Q3 of the magnet 1, even when the electricity is supplied to the coil 2, the magnetic force does not act toward the direction for rotating the magnet.

In the position shown in FIG. 18, although the magnet can be driven by the energization of the coil 2, so long as the energizing timing is not changed appropriately, the stable rotation of the magnet cannot be achieved. That is to say, from the condition shown in FIG. 8, when the outer magnetic poles 18a, 18b are magnetized to N poles, for example, even if the outer magnetic poles 18a, 18b are magnetized to S poles by reversing the energizing direction of the coil 2 after the magnet 1 was stopped at the same position as that shown in FIG. 17, as explained in connection with FIG. 17, the magnetic force does not act toward the direction for rotating the magnet.

The positioning stators 21, 22 and the magnet 1 constitute holding means. Further, since the positioning stators 21, 22 are positioned between the outer magnetic poles 18a and 18b, the size of the motor is not increased.

Next, an operation of the motor will be explained. From the condition shown in FIG. 3, when electricity is supplied to the coil 2 to magnetize the outer magnetic poles 18a, 18b to N poles and the inner magnetic poles 18c, 18d to S poles, the magnet 1 as the rotor is rotated in a counter-clockwise direction to reach a condition shown in FIG. 4.

Figure 4:
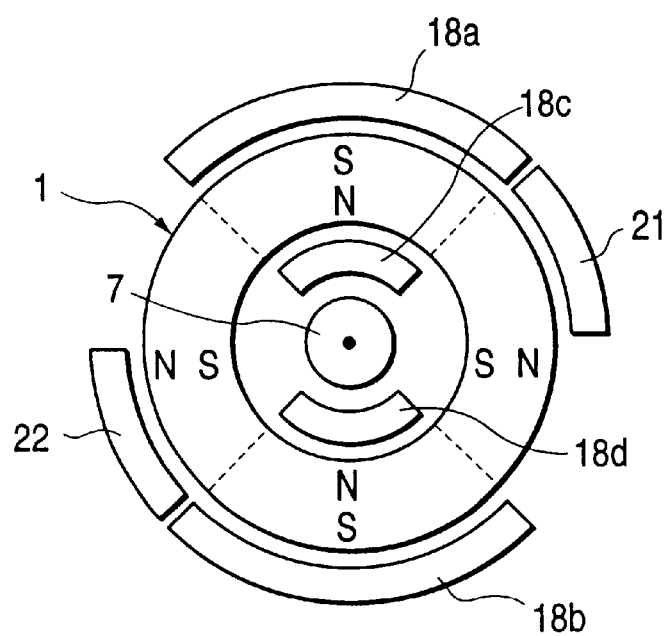
FIG. 4 is a view showing the condition of the rotor when the coil is energized from the condition of FIG. 3.
Figure 5:
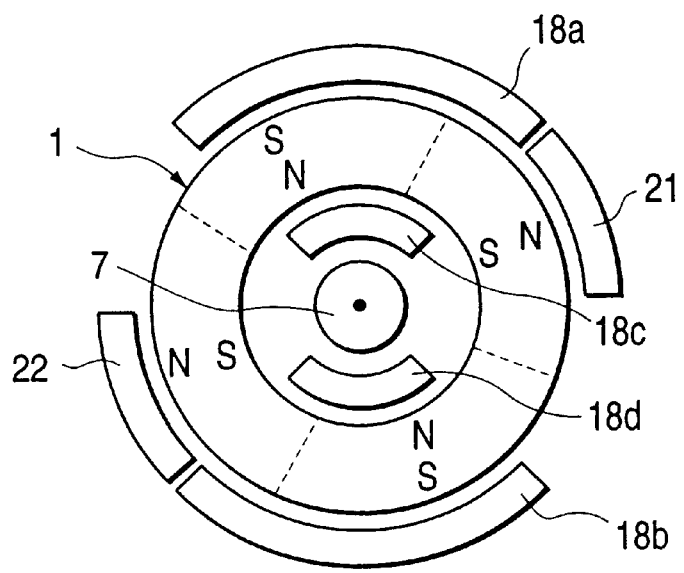
FIG. 5 is a view showing the condition of the rotor when the energization of the coil is interrupted in the condition of FIG. 4.

Since the positioning stators 21, 22 are almost not magnetized by the coil 2, the position of the magnet is substantially determined by the magnetized portions of the magnet 1 and the magnetized conditions of the outer magnetic poles 18a and the inner magnetic poles 18c, 18d of the stator 18 is obtained by the energization of the coil 2 (condition shown in FIG. 4). From this condition, when the coil 2 is disenergized, a condition shown in FIG. 5, which is stabilized by the magnetic force of the magnet 1, is established.

Figure 6:
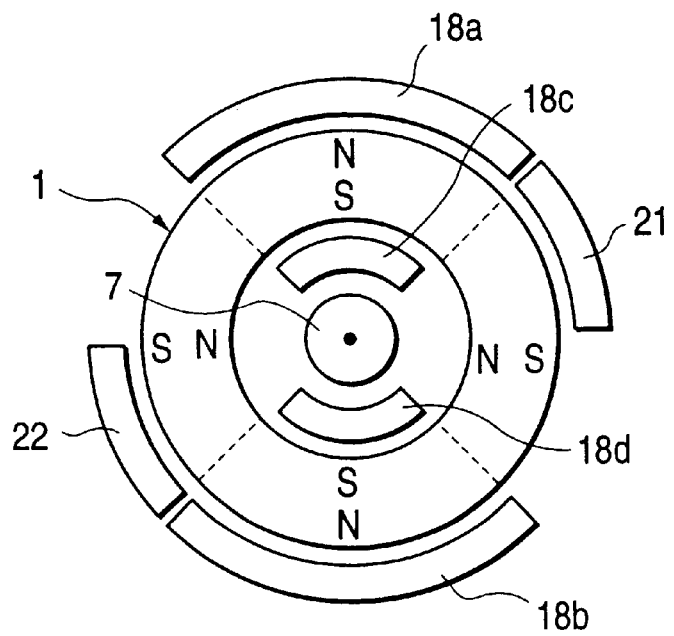
FIG. 6 is a view showing the condition of the rotor when the energization of the coil is reversed in the condition of FIG. 5.

Then, when the energizing direction of the coil 2 is reversed to magnetize the outer magnetic poles 18a, 18b of the stator 18 to S poles and the inner magnetic poles 18c, 18d to N poles, the magnet 1 as the rotor is further rotated in a counter-clockwise direction to reach the condition shown in FIG. 6.

Thereafter, by switching the energizing direction of the coil 2 alternately, the magnet 1 as the rotor is successively rotated to the positions corresponding to the energized phases.

Now, the reason why the above-mentioned motor has the optimum construction for a super-compact motor will be explained.

Regarding the fundamental construction of this motor, first, the magnet is formed as a hollow cylindrical shape, second, the outer peripheral surface of the magnet is divided into n sections, which are alternately magnetized, third, the coil and the magnet are disposed side by side in the axial direction of the magnet, fourth, the outer and inner magnetic poles of the stator, which are magnetized by the coil, are opposed to the outer and inner peripheral surfaces of the magnet, fifth, the outer magnetic poles are formed by the notches and teeth extending in parallel with the shaft, and, sixth, there is provided the holding means for holding the magnet in such a manner that the centers K1, K2, K3, K4 of the magnetized portions of the magnet are positioned at positions deviated from the straight line connecting the centers Q1, Q2 of the outer magnetic poles and the rotational center Q3 of the magnet when electricity is not supplied to the coil.

The diameter of the motor may be the extent that the magnetic poles of the stator can be opposed to the diameter of the magnet, and the length of the motor may be a length obtained by adding the length of the coil to the length of the magnet. Thus, since the dimension of the motor is determined by the diameters and lengths of the magnet and the coil, when the lengths of the magnet and the coil are made a minimum, a super-compact motor can be obtained.

In this case, if the diameters and lengths of the magnet and the coil are extremely reduced, it will be very difficult to maintain the accuracy of the motor. However, in the illustrated embodiment, the problem regarding the accuracy of the motor is solved and the motor can be manufactured cheaply by utilizing the simple arrangement in which the magnet is formed as the hollow cylindrical shape and the outer and inner magnetic poles of the stator are opposed to the outer and inner peripheral surfaces of the hollow cylindrical magnet. In this case, when magnetized portions are also provided on the inner peripheral surface of the magnet as well as the outer peripheral surface, the output of the motor can be further enhanced.

From the stop position of the motor attained by the holding means, when the electricity is first supplied to the coil, since the force of the magnetic flux generated by the coil and acting on the magnet is not directed toward the center of the magnet, the driving of the magnet can be performed stably.

Since the weight member 23 is rotated together with the output shaft 7 and the magnet 1, the rotation can be outputted as vibration, with the result that a super-compact pager motor can be provided.

Further, since the outer periphery of the weight member is concealed by the cover, the weight member can be prevented from inadvertent contact, with the result that lead wires or a flexible print substrate can be prevented from entering in the rotation path of the weight member during the assembling, thereby preventing poor operation easily.

Next, a second embodiment of the present invention will be explained with reference to FIGS. 7 to 12. Incidentally, the same elements as those in the first embodiment are designated by the same reference numerals and concrete explanation thereof will be omitted.

Figures 7, 8:
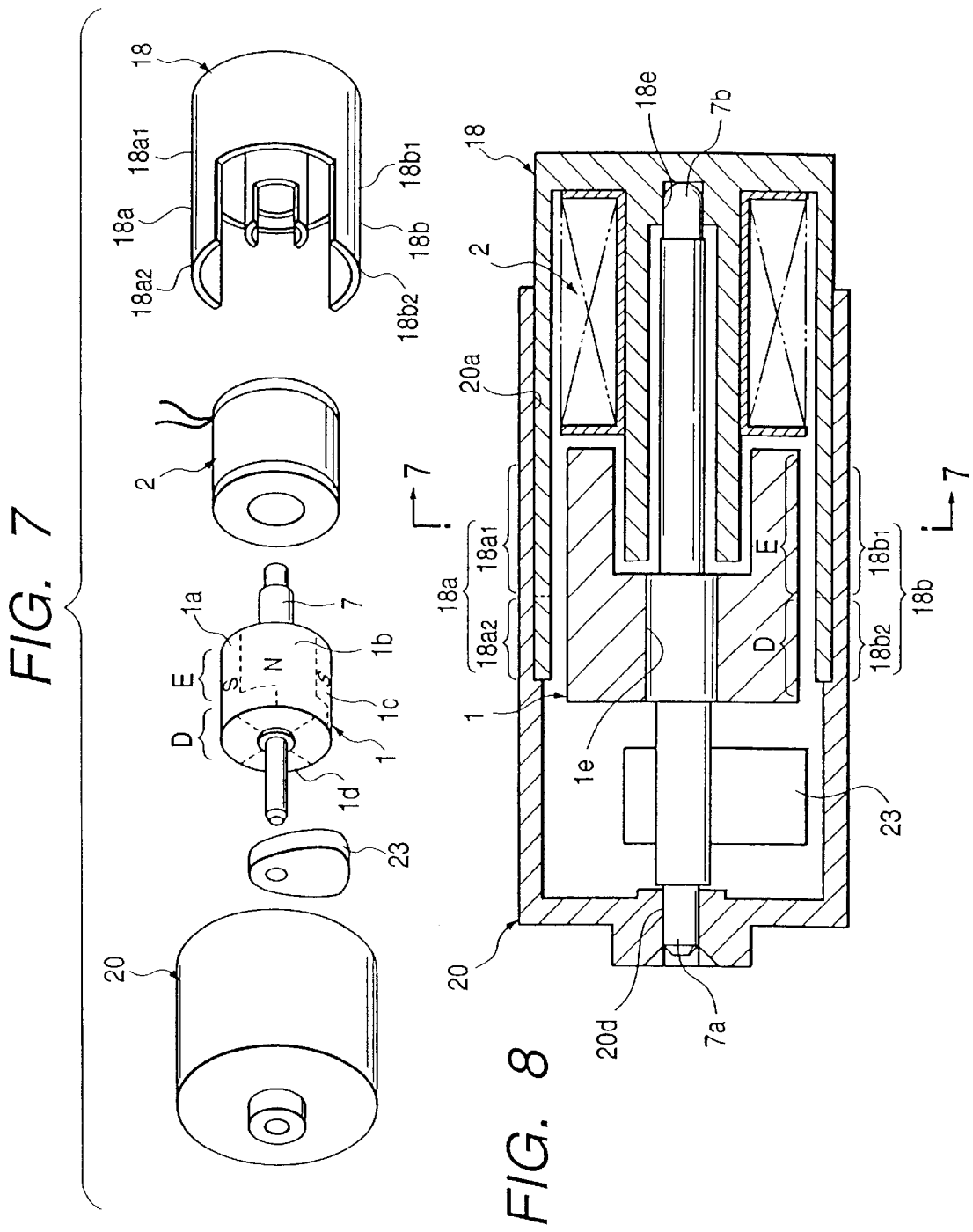
FIG. 7 is an exploded perspective view of a motor according to a second embodiment of the present invention.
FIG. 8 is a sectional view of the motor of FIG. 7 in an assembled condition.

FIG. 7 is an exploded perspective view of a motor according to a second embodiment of the present invention, FIG. 8 is a sectional view of the motor of FIG. 7 in an assembled condition, and FIGS. 9 to 12 are sectional views taken along the line A—A in FIG. 8.

In the second embodiment, outer magnetic poles 18a, 18b of a stator 18 are further extended to act as holding means. The outer magnetic poles 18a, 18b comprises sections 18a1, 18b1 opposed to the inner magnetic poles 18c, 18d, and extended sections 18a2, 18b2. Since the extended sections 18a2, 18b2 are not opposed to the inner magnetic poles 18c, 18d, even when the electricity is supplied to the coil 2, the extended sections are almost not magnetized in comparison with the sections 18a1, 18b1, thereby not generating the driving force.

Figure 9:
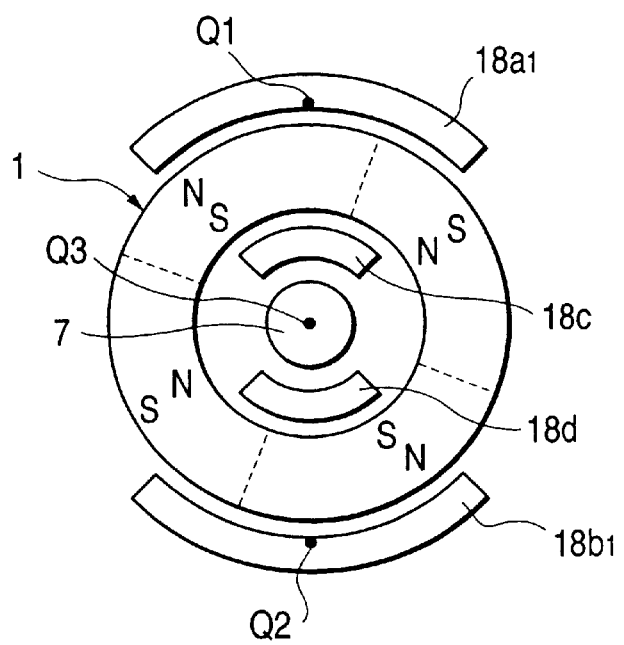
FIG. 9 is a view showing the positional relationship between a rotor and a stator of the motor of FIG. 8 and showing the condition of the rotor when a coil is not energized.

As shown in FIG. 7, a magnet 1 has areas E opposed to the sections 18a1, 18b1 and areas D opposed to the extended sections 18a2, 18b2, which areas have different magnetized phases. Thus, as shown in FIG. 9, when the electricity is not supplied to the coil 2, the areas E of the magnet 1 are held at positions deviated from a straight line connecting between centers of the sections 18a1, 18b1 (magnetized by the coil 2) of the outer magnetic poles 18a, 18b and a rotation center of the magnet.

Since the extended sections 18a2, 18b2 are not opposed to the inner magnetic poles 18c, 18d, even when the electricity is supplied to the coil 2, the extended sections are almost not magnetized in comparison with the sections 18a1, 18b1, thereby not generating the driving force. Accordingly, since the flux generated by the energization of the coil 2 extends substantially between the sections 18a1, 18b1 and the inner magnetic poles 18c, 18d, the force acting on the magnet is not directed toward the center of the magnet, the driving of the magnet can be performed stably.

Even when the electricity is supplied to the coil 2, the extended sections are almost not magnetized in comparison with the sections 18a1, 18b1 and thus do not almost influence the driving force generated by the energization of the coil 2, thereby picking up the stable output.

Next, an operation of the stepping motor will be explained. From the condition shown in FIG. 9, when the electricity is supplied to the coil 2 to magnetize the outer magnetic poles 18a, 18b of the stator 18 to N poles and the inner magnetic poles 18c, 18d to S poles, the magnet 1 as the rotor is rotated in a counter-clockwise direction to reach a condition shown in FIG. 10.

Figure 10:
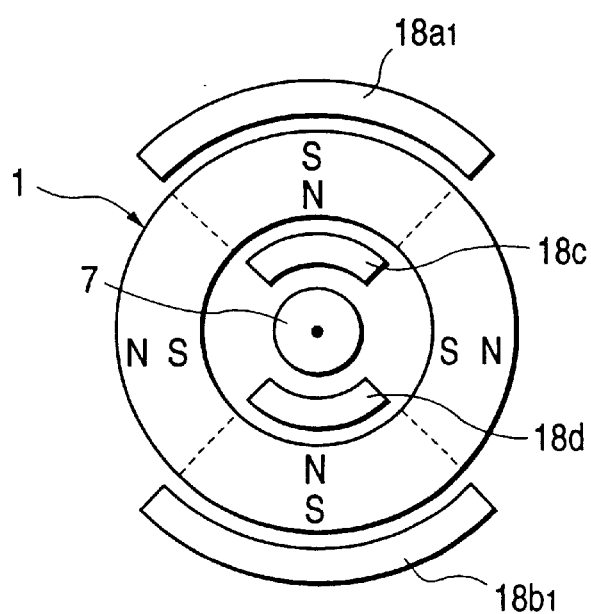
FIG. 10 is a view showing the condition of the rotor when the coil is energized from the condition of FIG. 9.

Since the extended sections 18a2, 18b2 corresponding to the positioning stators are almost not magnetized by the coil 2, the position of the magnet is substantially determined by the magnetized portions of the magnet 1 and the magnetized conditions of the outer magnetic poles 18a and the inner magnetic poles 18c, 18d of the stator 18 obtained by the energization of the coil 2 (condition shown in FIG. 10).

Figure 11:
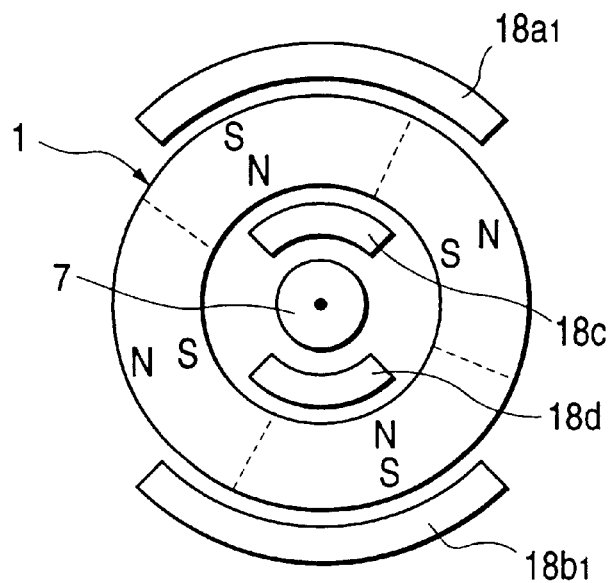
FIG. 11 is a view showing the condition of the rotor when the energization of the coil is interrupted in the condition of FIG. 10.

From this condition, when the coil 2 is disenergized, a condition shown in FIG. 11, which is stabilized by the magnet force of the magnet 1, is established.

Figure 12:
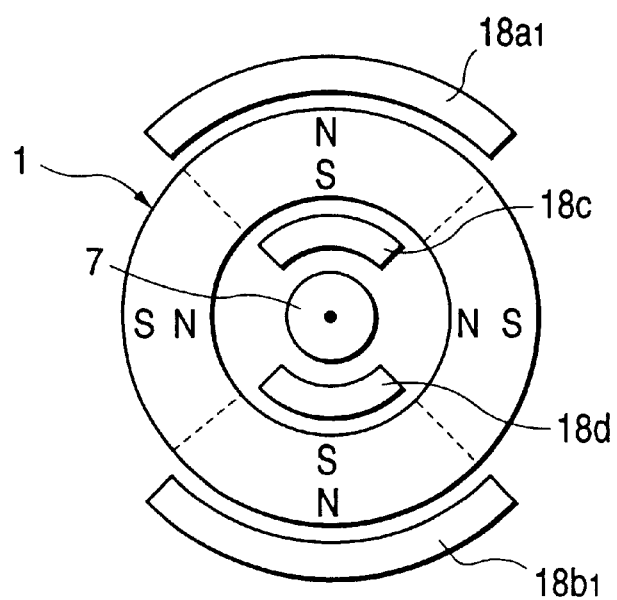
FIG. 12 is a view showing the condition of the rotor when the energization of the coil is reversed in the condition of FIG. 11.

Then, when the energizing direction of the coil 2 is reversed to magnetize the outer magnetic poles 18a, 18b of the stator 18 to S poles and the inner magnetic poles 18c, 18d to N poles, the magnet 1 as the rotor is further rotated in a counter-clockwise direction to reach a condition shown in FIG. 12.

Thereafter, by switching the energizing direction of the coil 2 alternately, the magnet 1 as the rotor is successively rotated to the positions corresponding to the energized phases.

In the illustrated embodiment, the holding means is constituted by the extended sections 18a2, 18b2 integrally formed with the outer magnetic poles of the stator 18. As a result, the number of parts can be reduced, and, thus, the assembling can be facilitated and the cost can be reduced.

Further, similar to the first embodiment, the diameter of the stepping motor may be the extent that the magnetic poles of the stator can be opposed to the diameter of the magnet, and the length of the stepping motor may be a length obtained by adding the length of the coil to the length of the magnet. Thus, since the dimension of the motor is determined by the diameters and lengths of the magnet and the coil, when the lengths of the magnet and the coil are made minimum, a super-compact motor can be obtained.

In this case, if the diameters and lengths of the magnet and the coil are extremely reduced, it will be very difficult to maintain the accuracy of the stepping motor. However, in the illustrated embodiment, the problem regarding the accuracy of the stepping motor is solved by utilizing the simple arrangement in which the magnet is formed as the hollow cylindrical shape and the outer and inner magnetic poles of the stator are opposed to the outer and inner peripheral surfaces of the hollow cylindrical magnet. In this case, when magnetized portions are also provided on the inner peripheral surface of the magnet as well as the outer peripheral surface, the output of the motor can be further enhanced.

A cover (cylindrical member) 20 is made of non-magnetic material, and the outer magnetic poles 18a, 18b are fitted within the interior 20a of the cover 20 and are secured to the cover by adhesive or the like.

A fitting portion 7a of the output shaft 7 is rotatably fitted in a fitting hole 20c of the cover 20 and a fitting portion 7b is rotatably fitted in a fitting hole 18e of the stator 18.

A weight member 23 is secured to the output shaft 7 so as to be rotated together with the output shaft 7 and the magnet 1. The weight member 23 has a configuration so that it has an imbalanced mass with respect to the rotational center, with the result that vibration is generated by rotation of the output shaft 7 and the magnet 1.

Further, the weight member 23 is disposed within the other interior 20b of the cover 20 together with the magnet 1 so that the weight member 23 is prevented from being contacted inadvertently from outside.

The cylindrical cover 20 has the single interior chamber 20a within which the constructional elements of the motor and the weight member 23 secured to the output shaft are housed.

Since the weight member 23 is rotated together with the output shaft 7 and the magnet 1, the rotation can be outputted as a vibration, with the result that a super-compact pager motor can be provided.

Further, since the weight member is completely concealed by the cover, the weight member can be prevented from inadvertent contact, with the result that lead wires or a flexible print substrate can be prevented from entering in the rotation path of the weight member during the assembling, thereby preventing the poor operation easily.

Next, an application example that the motor according to the first or second embodiment is applied to the destination informing apparatus will be explained with reference to FIGS. 13 to 16.

The motor of the first embodiment shown in FIGS. 1 and 2 or the motor of the second embodiment shown in FIGS. 7 and 8 is designated by "M".

Figure 13:
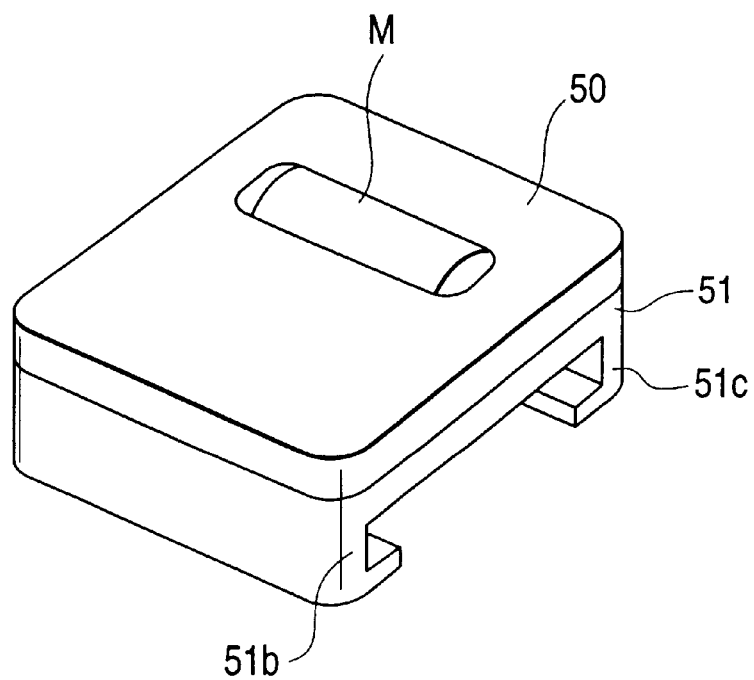
FIG. 13 is a perspective view showing an application example that the motor according to the first or second embodiment is used with a destination informing apparatus.
Figure 14:
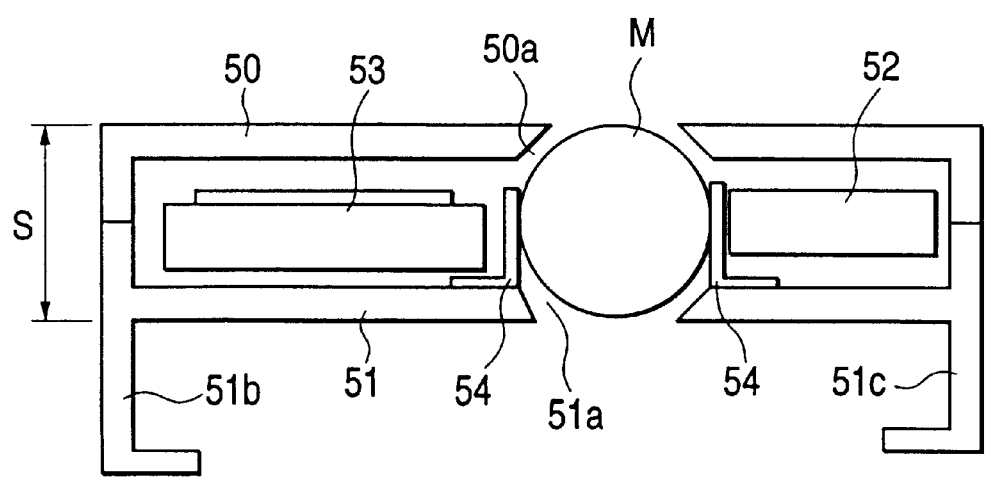
FIG. 14 is a sectional view of the destination informing apparatus shown in FIG. 13.
Figure 15:
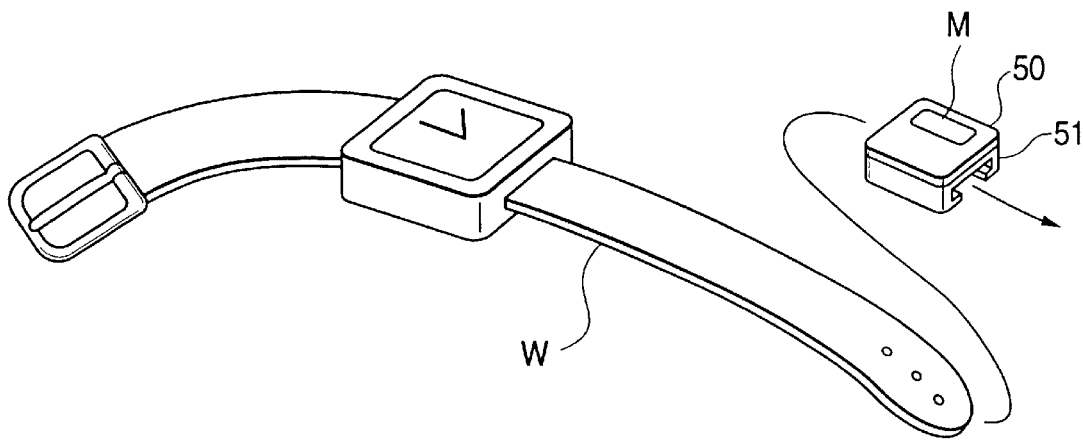
FIG. 15 is a perspective view showing mounting of the destination informing apparatus on a belt of a wrist watch.
Figure 16:
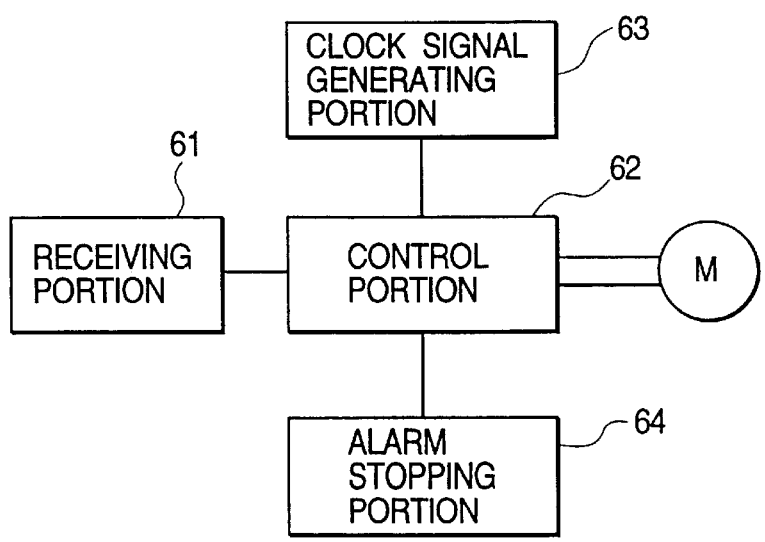
FIG. 16 is a control circuit block diagram of the destination informing apparatus shown in FIG. 14.

FIG. 13 is a perspective view of the destination informing apparatus C, FIG. 14 is a sectional view of the destination informing apparatus, and FIG. 15 is a view showing a condition that the destination informing apparatus C is mounted to a wrist watch.

The destination informing apparatus comprises an upper case 50, a lower case, a control circuit 52, a battery 53 and a motor attaching member 54 for attaching the motor M to the lower case 51. The upper and lower cases 50, 51 have windows 50a, 51a through which the cover of the motor M is exposed. Even when the motor is exposed in this way, since the weight member is covered by the cover 20, the user cannot touch the weight member directly. Since there is no need for covering the motor by the cases, the entire apparatus can be made thinner accordingly. Regarding the relationship between the weight member and the cover 20, since the number of parts existing between these elements is considerably smaller than the number of parts in the conventional example shown in FIG. 22, the distance between weight member and the cover can be reduced considerably.

Figure 22:
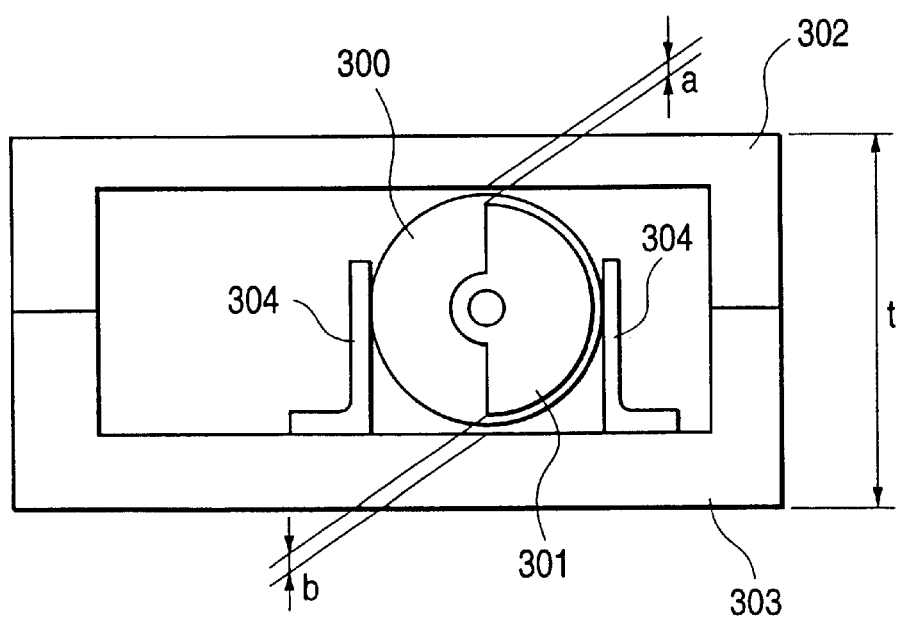
FIG. 22 is a view showing an example of a conventional destination informing apparatus of wrist watch type.

Accordingly, the diameter of the cover 20 can be made smaller than the thickness t in the conventional example shown in FIG. 22. Thus, a thickness s of the entire apparatus can be made thinnest. Namely, in the motor used in the application example of the present invention, only the input shaft 7 exists between the weight 23 and the cover 20. The fewer the number of parts between these elements, the smaller the total dimensional error of the parts and the total attachment error. Thus, the design distance between the weight 23 and the cover 20 can be minimized. More specifically, it is adequate that such distance is 0.1 mm to 0.2 mm. On the other hand, in the case of the conventional example shown in FIG. 22, since many parts such as the output shaft, motor cover and motor attaching member 104 are located between the weight 101 and the case 102 or 103, the total dimensional error of the parts and the total attachment error are increased accordingly. Further, when dimensional accuracy and flexion of the case 102 or 103 are taken in consideration, it is required that the adequate distance between the weight 101 and the case 102 or 103 be maintained. More specifically, in FIG. 22, it is required that distances a and b be selected to 0.5 mm to 1 mm. Even when it is assumed that the dimension of the weight 20 in the application example is the same as the dimension of the weight 101 in the conventional example and the thickness of the cover 20 for the motor M is the same as the thickness of the case 102 or 103 in the conventional example, in the application example of the present invention in which the distance can be minimized, the thickness of the apparatus can be reduced considerably in comparison with the conventional example. The lower case 51 is provided with attaching portions 51b, 51c so that the apparatus can be mounted to the wrist watch as shown in FIG. 15.

In FIG. 15, the wrist watch is designated by "W". The attaching portions 51b, 51c of the lower case 51 are flexible so that the apparatus can be fitted on a belt of the wrist watch exactly even when the belt has different size.

The control circuit 52 mainly includes a receiving portion 61, a control portion 62, a clock signal generating portion 63 and an alarm stopping portion 64. The receiving portion 61 serves to receive a radio wave emitted from a terminal of a portable telephone, and the control portion 62 cooperates with the clock signal generating portion 63 to detect and determine the destination on the basis of the received signal and serves to drive the motor M. The alarm stopping portion 64 is an input portion which, when operated, interrupts energization of the motor M for a predetermined time period to stop the alarming.

As mentioned above, according to the present invention, first, since the alarming mechanism comprises the motor and the weight, secured to the motor and having the imbalanced mass with respect to the rotational center and the weight, is disposed within the outer cover of the motor or is at least partially covered by the motor cover, the weight is prevented from contacting with the outer case of the destination informing apparatus and other constructional parts such as electrical elements and lead wires, and, thus, since an excessive gap is not required around the weight, the destination informing apparatus can be made more compact.

According to the present invention, second, since the cover of the motor is partially exposed from the cases of the destination informing apparatus, case portions of the destination informing apparatus for covering around the motor and the weight can be omitted, thereby making the communication apparatus more compact or thinner.

Further, since the weight and the outer cover of the motor (as a member for enclosing the weight to prevent the weight from external contact) are used, the number of parts existing between the weight and the outer cover becomes very small, and, thus, the distance between the weight and the outer cover can be reduced, thereby making the communication apparatus thinner.

According to the present invention, third, since the communication apparatus has the attaching portions through which the apparatus can be mounted and dismounted with respect to the belt of the wrist watch, and, thus, since the apparatus can be mounted to the wrist watch, the user can easily feel even minute vibration. Therefore, even when the motor and the weight are made compact, the function of the communication apparatus is not worsened. Accordingly, the communication apparatus can be made more compact. Further, since the motor is exposed from the cases of the communication apparatus, the vibration can be felt by the user more easily. Furthermore, since the communication apparatus has the attaching portions through which the apparatus can be mounted and dismounted with respect to the belt of the wrist watch, the apparatus can be mounted to the existing wrist watches without reducing their desirability from the viewpoint of fashion. In addition, since the communication apparatus is thinner and compact, even when the apparatus is attached to the wrist watch, the fashionable appearance thereof is not reduced, and the apparatus can easily be put on the user.

According to the present invention, fourth, a super-compact communication apparatus having high output can be provided by using a single phase motor.

The diameter of the motor may be the extent that the magnetic poles of the stator can be opposed to the diameter of the magnet, and the length of the stepping motor may be the length obtained by adding the length of the coil to the length of the magnet. Thus, since the dimension of the motor is determined by the diameters and lengths of the magnet and the coil, when the lengths of the magnet and the coil are made minimum, a super-compact motor can be obtained.

Further, by providing the holding means for holding the centers of the magnetized portions of the magnet at positions deviated from the straight line connecting the centers of the outer magnetic poles and the rotational center of the magnet when the outer and inner magnetic poles are not magnetized, even when the single phase motor is used, the initial positioning of the rotor can be stabilized.

According to the present invention, fifth, the rotor magnet of the motor is formed from plastic magnet material by injection molding. Thus, the thickness of the magnet in the radial direction can be reduced considerably. Accordingly, the distance between the outer magnetic poles and the inner magnetic poles of the stator can be minimized, thereby reducing reluctance of the magnetic circuit constituted by the coil 2 and the stator. As a result, much magnetic flux can be generated by a smaller current, thereby increasing output of the motor, reducing power consumption, and making the coil more compact.

The output shaft 7 is press-fitted into the fitting hole 1e of the magnet 1. Since the magnet of the motor is formed from plastic magnet material by injection molding, the magnet is not cracked during the press-fit assembling, and, the magnet having a complicated configuration, in which the fitting portion 1e having small hole is provided at the center of the magnet, can easily be manufactured. Further, since the output shaft 7 and the magnet 1 are assembled and secured to each other by a press-fit, the assembling operation can be facilitated, thereby reducing the manufacturing cost.

Particularly, as the material for the magnet 1, a mixture obtained by blending rare earth magnetic powder of Nd-Fe-B group and thermoplastic resin binder is used, and such mixture is injection-molded to form the plastic magnet. Thus, in comparison with the fact that a magnet manufactured by compression molding has a bending strength of about 500 Kgf/cm$^2$, for example, when polyamide resin is used as binder material, a bending strength more than 800 Kgf/cm$^2$ can be obtained, and a thin wall cylinder that could not be achieved by the compression molding can be obtained. When the magnet is constructed as the thin wall cylinder, performance of the motor is enhanced.

Further, a free configuration can be selected, a configuration for securing the rotor shaft (which cannot be achieved by compression-molding) can be integrated, and adequate rotor shaft securing strength can be obtained. Further, since excellent strength is given, even when the rotor shaft is press-fitted into the magnet, the magnet is not cracked.

At the same time, by integrally forming the rotor shaft securing portion, coaxial accuracy of the magnet portion with respect to the rotor shaft portion is enhanced, with the result that vibration can be minimized and the distance between the magnet and the stator portion can be reduced. Further, although the magnetic property of the injection-molded magnet is 5 to 7 MGOe in comparison with magnetic property of 8 MGOe or more of the compression magnet, adequate output torque of the motor can be obtained. Further, since the injection-molded magnet has a thin resin surface film, generation of rust is greatly suppressed in comparison with the compression magnet. Thus, anti-rust treatment such as painting can be omitted. The injection-molded magnet does not generate a problem regarding adhesion of magnetic powder which would be caused in the compression magnet.

Further, since there is no swelling of a surface which would be easily caused in anti-rust painting, the quality of the magnet is improved.

What is claimed is:

1. A motor comprising:
   a rotor magnet in a cylindrical shape, having at least an outer peripheral surface alternately magnetized to different poles along a circumferential direction to define magnetized portions and further having a rotor shaft;
   a coil disposed in an axial direction of said rotor magnet;
   outer magnetic poles opposed to the outer peripheral surface of said rotor magnet and magnetized by said coil, said outer magnetic poles being constituted by notches and teeth extending in parallel with the rotor shaft;
   inner magnetic poles opposed to the inner peripheral surface of said rotor magnet and magnetized by said coil;
   a positional stator disposed between the teeth of said outer magnetic poles magnetized to the same poles, so as to hold said rotor magnet in such a manner that centers of said magnetized portions of said rotor magnet are positioned at positions deviated from a straight line connecting centers of said outer magnetic poles and a rotational center of said rotor magnet when said outer and inner magnetic poles are not magnetized by said coil;
   a weight secured to said rotor shaft to be rotated therewith and having an imbalanced mass with respect to a rotational center; and
   a cylindrical cover within which said outer magnetic poles are secured and which is adapted to cover said weight secured to said rotor shaft.

2. A motor according to claim 1, wherein said outer and inner magnetic poles define a stator portion having a hole as a bearing for receiving one end of said rotor shaft, and said cylindrical cover is provided with a hole as a bearing for receiving the other end of said rotor shaft, and the one and the other ends of said rotor shaft are fitted into said holes.

3. A motor according to claim 2, wherein said other end of said rotor shaft passes through said bearing hole of said cylindrical cover to protrude from said hole, and said weight is secured to the protruded portion of the shaft.

4. A motor according to claim 2, wherein said cylindrical cover has a single interior chamber within which said rotor magnet and said weight are housed.

5. A motor according to claim 1, wherein the motor is used as an alarming mechanism of a communication apparatus, and said alarming mechanism of said communication apparatus detects a signal emitted from a terminal and is controlled on the basis of the detected signal to drive the motor, thereby vibrating said weight.

6. A motor according to claim 5, wherein the communication apparatus comprises a case covering said cylindrical cover and having an opening therein for exposing a part of said cylindrical cover.

7. A motor according to claim 1, wherein said coil is one winding coil.

8. A motor according to claim 1, wherein said outer magnetic poles and said inner magnetic poles are disposed at one end portion of the magnet to pinch the one end portion of the magnet therebetween.

* * * * *

UNITED STATES PATENT AND TRADEMARK OFFICE
CERTIFICATE OF CORRECTION

PATENT NO. : 6,465,916 B2 Page 1 of 1
DATED : October 15, 2002
INVENTOR(S) : Chikara Aoshima It is certified that error appears in the above-identified patent and that said Letters Patent is hereby corrected as shown below:

Column 1,
Line 56, "an" should read -- a --.

Column 2,
Line 17, "In" should read -- In a --.
Line 65, "high" should read -- a high --.

Column 6,
Line 47, "stator" should read -- stators --.

Column 8,
Line 60, "comprises" should read -- comprise --.

Column 11,
Line 58, "with" should be deleted.

Column 12,
Line 32, "having" should read -- having a --.
Line 66, "having" should read -- having a --.

Signed and Sealed this

Twentieth Day of May, 2003

JAMES E. ROGAN
*Director of the United States Patent and Trademark Office*